(12) United States Patent
Taherzadeh Boroujeni et al.

(10) Patent No.: US 9,559,759 B2
(45) Date of Patent: Jan. 31, 2017

(54) SYSTEM AND METHOD FOR MASSIVE MIMO COMMUNICATION

(71) Applicants: Mahmoud Taherzadeh Boroujeni, Ottawa (CA); Mohammadhadi Baligh, Ottawa (CA)

(72) Inventors: Mahmoud Taherzadeh Boroujeni, Ottawa (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/613,886

(22) Filed: Feb. 4, 2015

(65) Prior Publication Data

US 2016/0226564 A1    Aug. 4, 2016

(51) Int. Cl.
*H04B 7/04* (2006.01)
*H04W 88/08* (2009.01)

(52) U.S. Cl.
CPC .......... *H04B 7/0417* (2013.01); *H04B 7/0452* (2013.01); *H04B 7/0456* (2013.01); *H04W 88/08* (2013.01)

(58) Field of Classification Search
CPC ... H04B 7/0413; H04B 7/0417; H04B 7/0452; H04B 7/06; H04B 7/0686; H04B 7/0691; H04B 7/0456
USPC ................................. 375/267, 299; 455/562.1
See application file for complete search history.

(56) References Cited

U.S. PATENT DOCUMENTS

| | | | |
|---|---|---|---|
| 8,824,596 B1* | 9/2014 | Wang | H04B 7/0404 375/267 |
| 9,363,003 B2* | 6/2016 | Ishihara | H04B 7/0615 |
| 2012/0163217 A1 | 6/2012 | Kim et al. | |
| 2013/0315328 A1 | 11/2013 | Liu | |
| 2014/0140235 A1* | 5/2014 | Park | H04W 52/244 370/252 |
| 2014/0184446 A1 | 7/2014 | Park et al. | |

FOREIGN PATENT DOCUMENTS

| | | | |
|---|---|---|---|
| WO | 2014071582 A1 | | 5/2014 |
| WO | WO2014/073522 | * | 5/2014 |

OTHER PUBLICATIONS

PCT International Search Report, PCT/CN2016/070890, Apr. 12, 2016, 11 pages.

* cited by examiner

*Primary Examiner* — Betsy Deppe

(57) ABSTRACT

A system and method of adjusting an equivalent channel for a downlink in a multiple-antenna communication system is disclosed herein. The system includes at least one user device and a base station having a plurality of analog RF chains, each analog RF chain having a plurality of antennas. The method comprises the base station obtaining equivalent channel information and adjusting the phases of the antennas in order to modify equivalent channel gains from the analog RF chains to the at least one user device, based on the equivalent channel information.

13 Claims, 9 Drawing Sheets

SYSTEM AND METHOD FOR MASSIVE MIMO COMMUNICATION

FIELD OF THE INVENTION

The present disclosure relates generally to hybrid baseband/RF transmission and reception in massive multiple input and multiple output (MIMO) communication systems and methods.

BACKGROUND

There are various types of communications systems that can be used to communicate data wirelessly. An example of such a communication system is the multiple input multiple output (MIMO) communication systems. In MIMO systems there are multiple antennas at the transmitter end and at the receiver end. A further example is the massive MIMO communication system in which a very large number of antennas are used.

Improvements in wireless communication systems are desirable.

SUMMARY

In a first aspect, the present disclosure provides a method of adjusting an equivalent channel for a downlink in a multiple-antenna communication system. The system includes a base station that includes a plurality of analog RF chains where each analog RF chain is coupled to a plurality of antennas. The method can include obtaining, by the base station, equivalent channel information; and adjusting, by the base station, phases of the antennas in order to modify equivalent channel gains between the analog RF chains and at least one user device, based on the equivalent channel information.

In some embodiments, the method can be performed for a downlink and obtaining equivalent channel information can include the base station receiving a transmission from at least one device and the base station estimating the equivalent channel information based on the received transmission.

In some embodiments, the method can be performed for a downlink and obtaining equivalent channel information can include the base station transmitting a RF beam to the at least one user device and receiving, by the base station, feedback from at least one user device. The feedback can be generated based on compressed sensing techniques.

The system can include a plurality of user devices and each user device can correspond to a group of antennas of the base station. The method can further include, for each of the plurality of user devices, the base station transmitting a RF beam to the user device; receiving feedback from the user device; and the base station adjusting the phases of the antennas corresponding to the user device. In an embodiment, the phases are adjusted in a recursive manner for the plurality of user devices. In other words, in some embodiments, the phases of the antennas of a particular RF chain are adjusted and then the phases of the antennas of a different RF chain are adjusted and so on, until the antennas of each of the RF chains have been processed. The term processed as used herein means that the phases of the antennas of the RF chains have been assigned or adjusted.

In an embodiment, when adjusting the phases of antennas of a RF chain, the phases of antennas of previously processed RF chains are treated as fixed.

In an embodiment, modifying equivalent channel can include maximizing a determinant of an equivalent channel matrix for the system or maximizing a Frobenius norm of an equivalent channel matrix for the system.

In an embodiment, before adjusting the phases of the antenna groups, the method can further include assigning phases of the antennas of each RF chain to maximize a direct gain from each RF chain to the corresponding user device based on the received feedback.

In an embodiment, obtaining, by the base station, equivalent channel information can include: receiving, by the base station, uplink transmissions from a plurality of user devices; estimating, by the base station, equivalent channel information based on the received transmissions. Adjusting phases of the antennas can include: assigning, by the base station, phases of antennas of a first RF chain to maximize the gain from a first user device to the first RF chain of the base station; and assigning, by the base station, phases of antennas of other RF chains of the base station, in order to modify equivalent channel gains from the analog RF chains to the plurality of user devices.

In another aspect, the present disclosure provides a base station comprising, a plurality of analog RF chains, a plurality of antenna groups, and a processor. Each of the plurality of antenna groups is coupled to one of the analog RF chains. Each of the antenna groups includes a plurality of antennas. The processor is configured to obtain equivalent channel information and, based on the equivalent channel information, adjust phases of the antennas in order to modify equivalent channel gains between the analog RF chains and the at least one user device.

In an embodiment, the processor can be configured to obtain equivalent channel information by processing a transmission received by the base station from the at least one user device and estimating the equivalent channel information based on the received transmission.

In an embodiment, the processor can be configured to obtain equivalent channel information by transmitting a RF beam to the at least one user device and processing feedback received by the base station from the at least one user device. The feedback can include the equivalent channel information.

In an embodiment, the processor can be further configured to: process transmissions received by the base station from a plurality of user devices, each user device corresponding to one of the plurality of RF chains; obtain the equivalent channel information based on the received transmission; assign phases of the antennas of a first RF chain to maximize the gain from a corresponding user device to the first RF chain, based on the equivalent channel information; and recursively, for the remaining RF chains: assign phases of the antennas in order to modify equivalent channel gains from the analog RF chains to the plurality of user devices, based on the equivalent channel information.

In an embodiment, when adjusting the phases of antennas of a RF chain, the phases of antennas of previously processed RF chains are treated as fixed.

In an embodiment, modifying equivalent channel gains can include maximizing a determinant of an equivalent channel matrix for the system or maximizing a Frobenius norm of an equivalent channel matrix for the system.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1A:
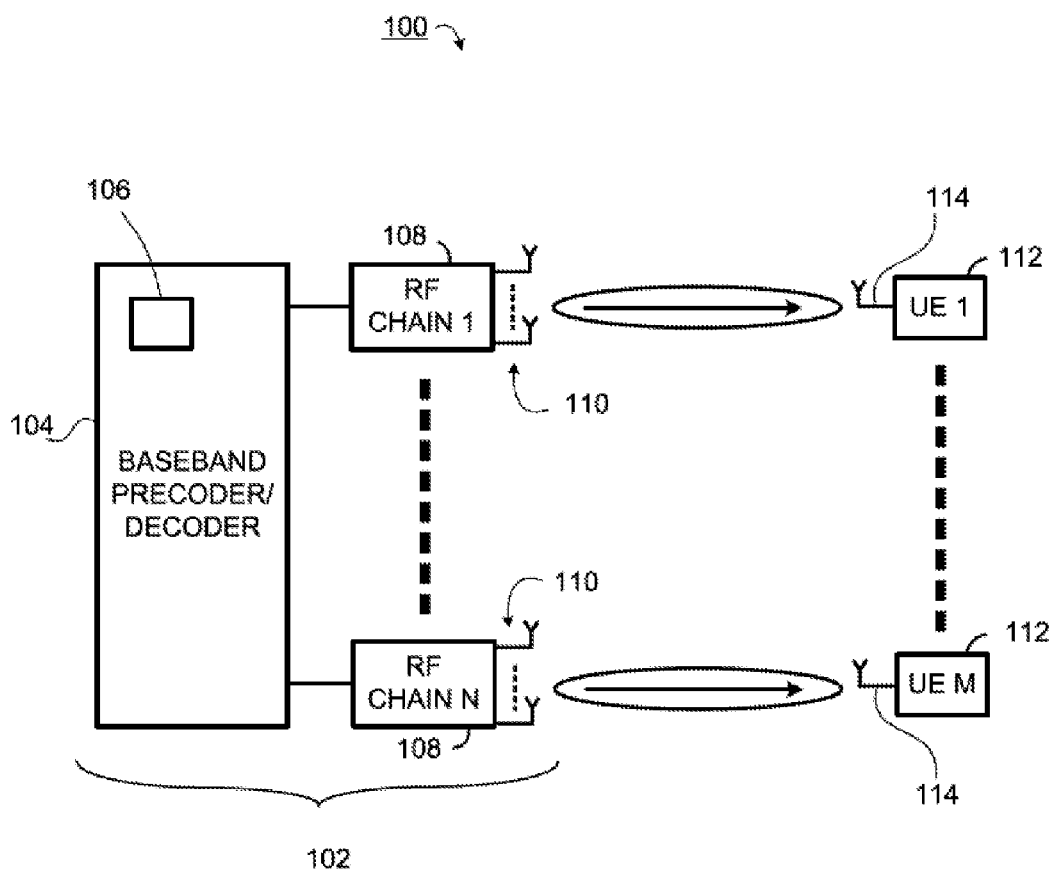
FIGS. 1A and 1B are block diagrams of a communication system in accordance with an embodiment of the present disclosure.

Various embodiments described here relate to precoding and decoding techniques for massive MIMO communication systems. The term massive MIMO communication system as used herein refers to a system in which there are a very large number of antennas at one end (e.g. at a transmitter or a base station) and a number of antennas at the other end (e.g. receiver). Not every device in such a system need have more than 1 antenna. For example, there could be a number of antennas at one end (such as at the base station) and there could be a number of user devices communicating with the base station, where at least some of the user devices have only one antenna (see e.g. FIG. 1 described below). In various embodiments, the actual number of antennas at a device in the system, such as for example at a base station, can vary from less than a hundred to thousands.

The inventors have recognized a need to increase coverage and throughput in wireless networks. In furtherance of such a goal, the inventors have recognized this as a reason for the utilization of large number of antennas at base stations. Increasing the number of antennas can help to increase the multiplexing capability and/or rate per user by, for example, increasing the effective SNR through beamforming gain.

Traditional massive multiple input multiple output systems have been proposed. In an example system, a massive antenna system with non-cooperative base stations is used. It was conjectured by some that when the number of users per cell is fixed, by increasing the number of antennas per base station towards infinity, the performance converges to a limit which is dependent on the level of pilot contamination (and channel estimation error). It was also conjectured that for very large number of antennas and under certain channel conditions, the simplest precoding/decoding schemes for Down Link (DL) and Up Link (UL) (i.e. eigen-beamforming for downlink and match filter for uplink) are sufficient for adequate performance.

The inventors have further recognized that there are several issues with the classic massive MIMO approach. For example, even for a very large number of antennas, there is still a large gap between the performance of simple precoding and decoding techniques as compared to zero-forcing or MMSE types of precoding and decoding techniques. In addition, given that the size of channel matrices is very large, zero-forcing and MMSE types of precoding and decoding can have a very high level of complexity. Further, given that knowledge of all channel gains is used in traditional systems, the feedback overhead in Frequency Division Duplex (FDD) can be prohibitive and therefore Time Division Duplex (TDD) may be the only viable option in practical applications of traditional systems. In addition, based on the limiting effect of pilot contamination and inter-cell interference, the classic massive MIMO approach may benefit from the development of simple collaboration algorithms among the base stations to reduce the effect of pilot contamination and inter-cell interference.

Another issue, in terms of hardware cost and energy usage, is the problem of having a large number of radio frequency (RF) chains. The RF chains typically include RF circuitry, Digital to Analog Converters (DACs), and Analog to Digital Converts (ADCs). Such equipment can be expensive and therefore there can be a significant cost associated with having a large number of RF chains at, for example, a base station. Accordingly, it may be desirable to have a Massive MIMO solution with a reduced number of RF chains. However, the inventors have recognized that the most straight-forward solution, which simply involves forming beams towards users and maximizing their gains, provides a reduced level of performance as compared to a full baseband precoding system (e.g. an equivalent system that includes one RF chain for each antenna). Some embodiments disclosed herein relate to modified hybrid baseband-RF precoding/detection methods that recover a part of the gap in performance.

In various embodiments of the massive MIMO systems disclosed herein, a plurality of groups of antennas are used and each group of antennas is fed by a RF chain. This allows for the use of reduced number of RF chains and the cost associated therewith is also reduced.

In various embodiments, if the narrow beam of each group of antennas is aimed at a user, then the whole overall channel matrix becomes sparse. The channel matrix generally includes some large direct coefficients to the corresponding users and a few other non-negligible coefficients from other users, mostly as a result of reflections and a multipath effect. A corresponding user can be, for example, an intended recipient of a transmission from an antenna group, or a user assigned to a particular antenna group. Some embodiments disclosed herein, use a compressed sensing approach for sounding and channel measurement.

In an embodiment, zero-forcing techniques are utilized for precoding to cancel unwanted interference. Due to the sparsity of the matrix, the matrix inversion complexity can be lower than it would be otherwise. Other embodiments utilize other precoding methods such as LLL-based methods as well as other approximations of the dirty paper coding (DPC) and the vector Tomlinson-Harashima precoding methods. Such moderate-complexity nonlinear precoding methods are practical in such situations due, in part, to the small number of interfering beams in such a system.

In addition, various embodiments disclosed herein utilize FDD for feedback. The smaller number of the nonzero coefficients makes feedback possible in the case where FDD is utilized.

Figure 1B:
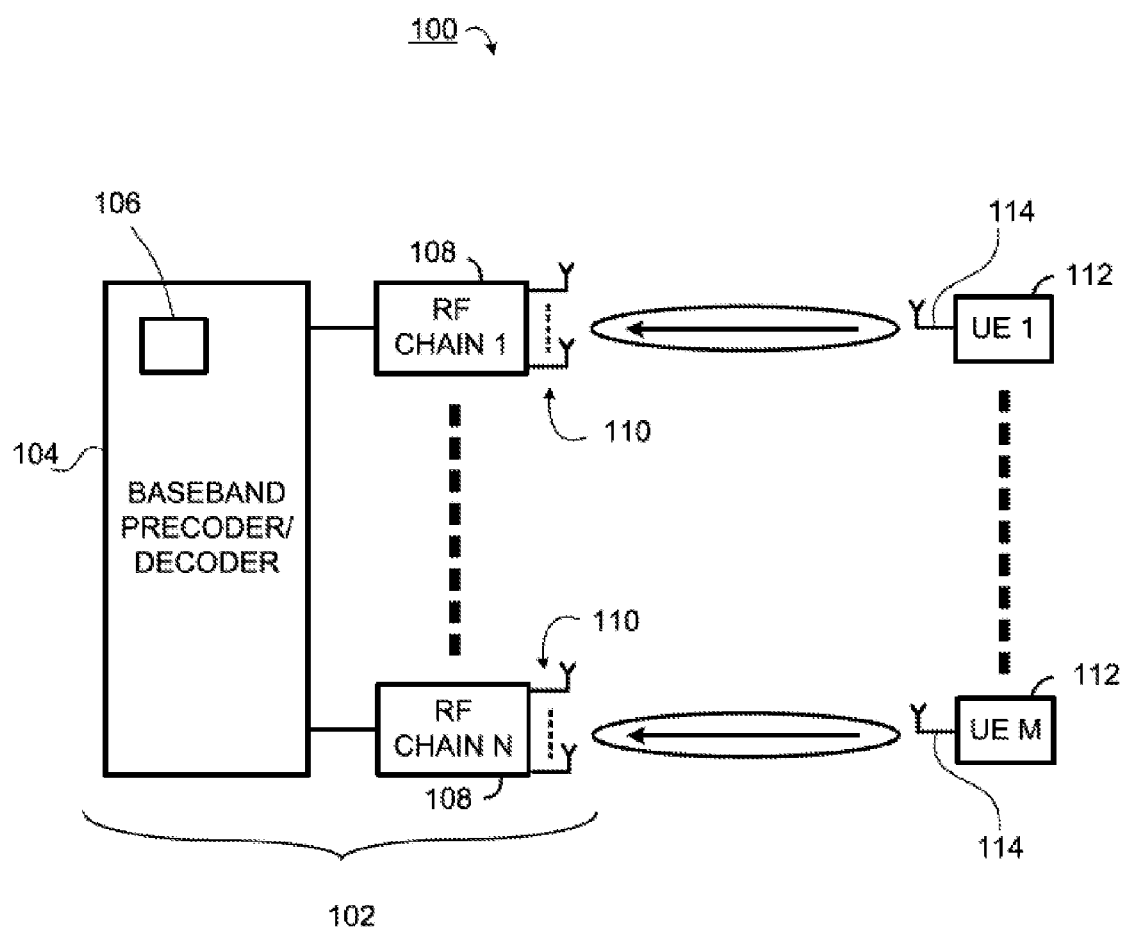

Reference is first made to FIGS. 1A and 1B, which illustrates block diagrams of a massive MIMO system 100 in accordance with an embodiment of the present disclosure. FIG. 1A illustrates system 100 during a downlink and FIG. 1B illustrates the same system during an uplink. System 100 includes a base station 102. Base station 102 includes a baseband precoder/decoder 104, which includes circuitry such as processor 106 for carrying out precoding, decoding, and detection methods, and a plurality of RF chains 108. The terms detection and decoding will be used interchangeably herein. The plurality of RF chains 108 are coupled to baseband precoder/decoder 104. Each RF chain 108 is coupled to a group of antennas 110.

Although FIG. 1A illustrates system 100 performing precoding during a downlink and FIG. 1B illustrates the system performing decoding during an uplink, it is not necessary that all RF chains 108 be performing the same function. Specifically, one RF chain 108 may be performing an uplink while another may be performing a downlink. In some embodiments, the system 100 operates with FDD and therefore the same RF chain 108 can perform uplink and downlink simultaneously.

System 100 also includes a plurality of user devices 112. The symbol UE may be used in place of the term "user device". UE is an acronym for "user equipment". User devices 112 each include an antenna 114 for communicating with base station 102. In an embodiment, one or more RF chains 108 are assigned to each user device 112. In an embodiment, user device 112 is a mobile communication device, such as, for example, but not limited to, a cellular telephone, smartphone, phablet, and tablet computer.

Various embodiments of the precoder and decoder methods described herein can be used in conjunction with system 100.

Figure 1C:
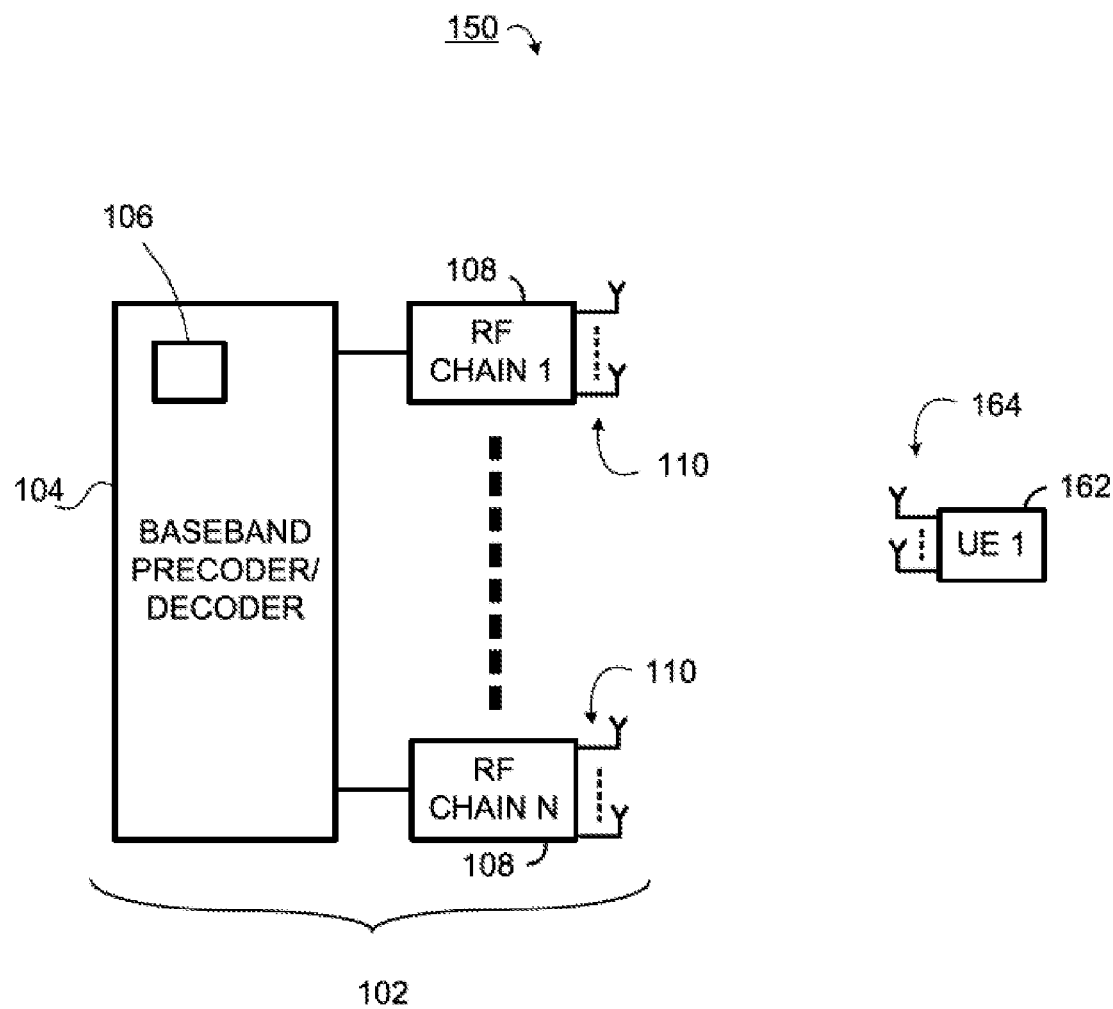
FIG. 1C is a block diagram of a communication system in accordance with another embodiment of the present disclosure.

Reference is now made to FIG. 1C, which illustrates a block diagram of a massive MIMO system 150 in accordance with an embodiment of the present disclosure. System 150 includes a base station 102 that is similar to the base station of FIG. 1. The user device 162 includes a group of antennas 164. System 150 can be used in asymmetric hybrid baseband-RF decoding/precoding. Various embodiments of the precoder and decoder methods described herein can be used in conjunction with system 150.

Asymmetric hybrid baseband-RF decoding/precoding can be used when the base station has a larger number of antennas than the user device, but the corresponding number of RF chains of the base station is on the same order as the number of antennas in the user device. This model can also be approximately applied when the base station is serving two or more user devices using different subsets of RF chains and their corresponding beams are totally disjoint (non-overlapping). This scenario can be particularly relevant when the user devices are far from each other and only see close local scattering.

Some approaches of hybrid baseband-RF beamforming involve maximizing the direct gains from each RF chain to the corresponding user device. This is done by changing the analog phases in the RF chain so that all gains from the antennas of each group to the corresponding user device align with each other (have the same phase). In general, several RF chains can be assigned to serve the same user device. Multiplexing among different users is done by digital precoding (for Downlink) or digital MIMO decoding (for Uplink). One possible problem with this approach is that while the direct gains (from RF chains to intended UEs) can be high, the matrix $H_{eq}$ can have small determinant or even a near singular condition. The matrix $H_{eq}$ is the equivalent channel matrix from the transmitter RF chains to the receiver antennas, that is, the antennas at the user devices or UEs.

When the equivalent channel matrix has a small determinant, the capacity of the hybrid baseband-RF system and the achievable rate of a variety of precoding methods (ranging from the more complex, such as dirty paper coding, to the easier linear precoders like zero forcing) are negatively impacted. Various embodiments disclosed herein address the issue of having an equivalent channel matrix with a small determinant by increasing the determinant of $H_{eq}$.

Consider H as the M×NL channel matrix where M is the number of UEs and N is the number of RF chains at the base station and L is the number of antennas per RF chain. If we consider $F_{BF}$ as the analog beamforming matrix, then $H_{eq} = HF_{BF}$. Here, $H_{eq}$ is an M×N matrix which can be a nonsquare matrix.

To increase the determinant of $H_{eq}$, instead of aligning the direct gains from antennas to the corresponding users, various embodiments disclosed herein select the analog phases so that the orthogonal component of antenna gain (with respect to the channel of other RF chains) becomes aligned. In some embodiments disclosed herein, the precoding and decoding methods begin by beamforming between the first RF chain 108 and the corresponding UE 112 in order to maximize the direct gain between the two. In some embodiments, in a recursive manner for each subsequent RF chain, the system then selects phases for that RF chain 108 by aligning the orthogonal component of antenna gains with respect to the channel of previously processed RF chains 108.

Various embodiments of system 100 increase the determinant of $H_{eq}$ by obtaining the phases for the $(i+1)^{th}$ RF chain 108 of base station 102 in the following manner. In order to simplify the explanation, consider the situation in which one RF chain 108 is assigned to each user device 112. Consider $H_{i+1}$ as the first i+1 rows of the matrix H (corresponding to the first i UEs) and $F_i$ as the first i columns of the matrix $F_{BF}$ (that are completed in previous steps) and $F_{i,k}$ as an NL×(i+1) matrix which is obtained by adding a column to the matrix $F_i$, where the entries of the column are zero other than the $(Li+k)^{th}$ entry which is 1 (corresponding to the analog phase on $k^{th}$ antenna connecting to the $(i+1)^{th}$ RF chain). Then base station 102 obtains the phase corresponding to the analog phase on $k^{th}$ antenna connecting to the $(i+1)^{th}$ RF chain (assuming that the phases of the first i antenna array are fixed) by performing the following operation:

$$f_{iL+k} = \frac{(\det(H_{i+1}F_{i,k}))'}{|\det(H_{i+1}F_{i,k})|}$$

where (x)' designates the complex conjugate of x. For the case that N>M and multiple RF chains correspond to the same single-antenna UE, the same process can be applied by considering jL antennas corresponding to the first i UEs (j≥i) and obtaining $f_{jL+k}$ for all antennas corresponding to the (i+1)th UE (for $1 \leq k \leq n_{i+1}L$ where $n_{i+1}$ is the number of RF chains assigned to the $(i+1)^{th}$ UE).

The extra feedback that is needed for this calculation are the gains of the equivalent channel seen by the first i user devices. If only a few other user devices have cross interference with the link between $(i+1)^{th}$ antenna array and $(i+1)^{th}$ user device, the calculation can be simplified by considering only the corresponding sub-matrices.

Figure 2:
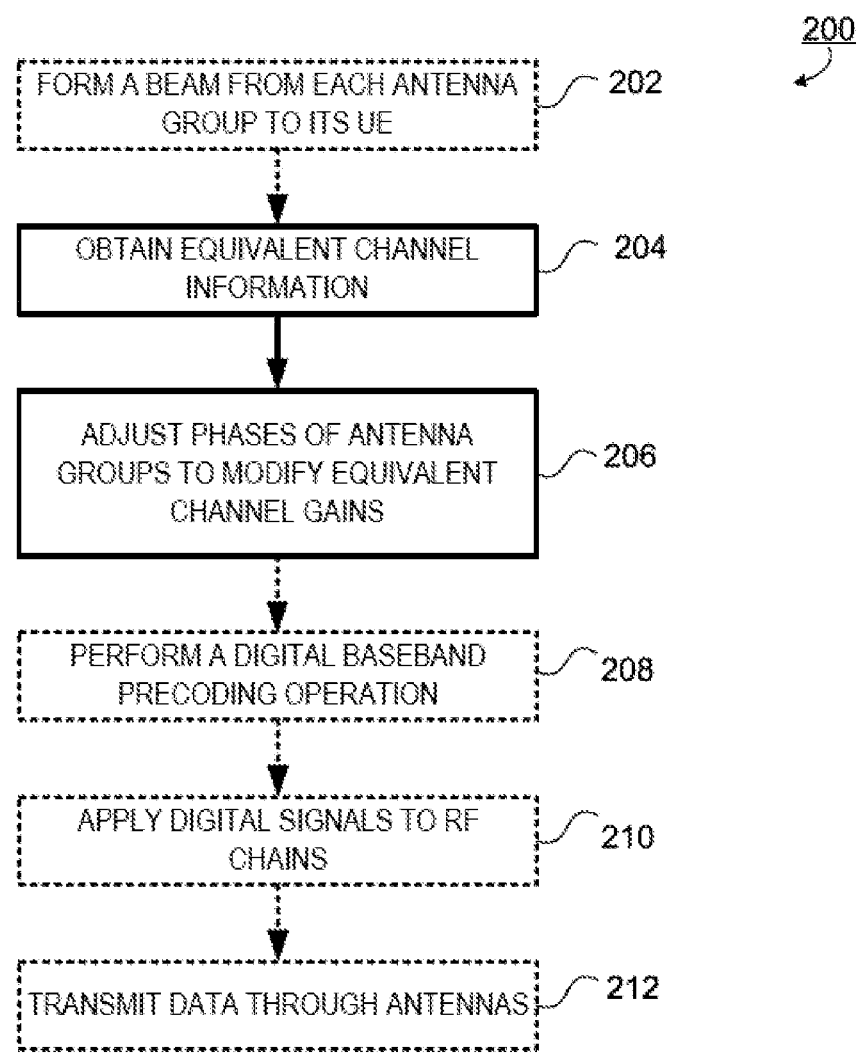
FIG. 2 is a flow chart diagram illustrating a method of adjusting an equivalent channel for a downlink or an uplink in accordance with an embodiment of the present disclosure.

A flowchart illustrating a method 200 of adjusting an equivalent channel for a downlink or an uplink in system 100 is illustrated in FIG. 2. The term "equivalent channel", as used herein, is the effective channel between two points in a network. The equivalent channel can be, for example, described by a mathematical model. For example, the equivalent channel between an RF chain and a user device could be described by parameters that model the effect of elements that are between RF chain and the user device, including for example the antennas coupled to the RF chain, their corresponding phases and gains and the physical channel between the base station antennas and the UE.

The equivalent channel is adjusted or optimized in order to improve (e.g. make more efficient) data transmission. The method may be carried out by software executed, for example, by processor 106 of base station 102. Coding of software for carrying out such a method is within the scope of a person of ordinary skill in the art given the present description. The method may contain additional or fewer processes than shown and/or described, and may be performed in a different order. Computer-readable code executable by at least one processor of base station 102 to perform the method may be stored in a computer-readable storage medium device or apparatus, which may be a non-transitory or tangible storage medium.

In situations where method 200 is used for a downlink, at 202, a beam is formed from each of the antenna groups to their respective corresponding user devices or UEs. The antenna groups can form their beams in parallel. In other words, in an embodiment, the antenna groups can form their beams at the same time.

As noted above, in various embodiments, each antenna group corresponds to a particular RF chain. Therefore, referring to a UE as corresponding to a particular antenna group is equivalent to referring to that UE as corresponding to a particular RF chain. Similarly, where referring to antennas of an antenna group, this is equivalent to referring to the antennas of a particular RF chain and vice versa.

As will be understood by those of skill in the art, prior to 202 the base station and UEs may undergo an initiation phase. During the initiation phase the base station may determine the angle of arrival and/or departure of signals and/or other parameters.

At 204, equivalent channel information is obtained by the base station. The term "equivalent channel information" as used herein is information that relates to an equivalent channel between two points in a network. Equivalent channel information can include, for example, parameters that define a mathematical model of the equivalent channel between the two points. The equivalent channel information may be obtained in various ways. For example, in some embodiments, feedback is received from each of the user devices. Such an approach can be used in systems where communication is executed based on FDD. In an embodiment, the feedback comprises equivalent channel information that may be estimated by the user device. The feedback can include, for example, the gain that the user device detects from various RF chains. In an embodiment, compressed sensing is used and the feedback includes only the gains detected from a subset of the various RF chains. In various embodiments, the subset corresponds to not more than a third of the RF chains. In other embodiments, the subset corresponds to not more than a fifth of the RF chains. In other embodiments, the subset corresponds to not more than three RF chains. In other embodiments, the subset corresponds to one or two RF chains. In some embodiments, the feedback comprises only the gains of antenna groups where the detected gain is above a threshold value.

In other embodiments, the base station estimates the equivalent channel information based on transmissions received from the UEs. The transmissions from the UEs, in this case, can be normal uplink transmissions having communication data (i.e. the data in the message does not include equivalent channel information) or pilot signals. Such an approach can be used for a downlink by a system operating with TDD. Alternatively, such an embodiment can be used for modifying the equivalent channel for uplink communications in systems utilizing FDD.

At 206, the phases of the antennas are adjusted in order to modify equivalent channel gains between the analog RF chains to the user devices, based on the equivalent channel information. Modifying the equivalent channel gains has the effect of altering or adjusting a characteristic of the equivalent channel matrix. In some embodiments, the characteristic that is adjusted is the determinant of the equivalent channel matrix and the phases are adjusted to maximize the determinant. This can be accomplished in the manner described above. In other embodiments, other characteristics are adjusted. For example, in an embodiment, the Frobenius norm of the equivalent channel matrix is maximized. In another embodiment, the corresponding capacity of the equivalent channel, which is determined by the equivalent channel matrix, is maximized. In yet other embodiments, a combination of the determinant and Frobenius norm are maximized. In yet other embodiments, any suitable function of the equivalent channel matrix can be optimized. In an embodiment, when the phases of a particular antenna group are adjusted to alter a characteristic of the equivalent channel matrix at 312, the phases of the other antennas are treated as being fixed.

As mentioned above, method 200 can be used for uplink or downlink. Accordingly, following process 206 (and prior to process 204), there can be included processes for either uplink or downlink. To illustrate this feature, processes 202, 208, 210, and 212, which relate to downlink, that is, the actual sending of data, are illustrated in FIG. 2. Processes 204 and 206 are used to improve or optimize the equivalent channel such that the data is communicated more efficiently in either an uplink or a downlink.

At 208, a digital baseband precoding operation is performed at base station 102. For example, the operation may be performed by processor 106 of baseband precoder/decoder 104. This process converts data to digital signals, which include digital symbols, for transmission to the user devices.

At 210, the digital signals are applied to the RF chains 108. As mentioned above, the RF chains may include a variety of circuitry, including but not limited to, RF circuitry, Digital to Analog Converters (DACs), and Analog to Digital Converts (ADCs), and amplifiers. The RF chains process and convert the digital symbols to analog signals that are applied to the antennas of the antenna groups 110.

At 212, the antenna groups transmit the data to their respective corresponding user devices or UEs.

Figure 3:
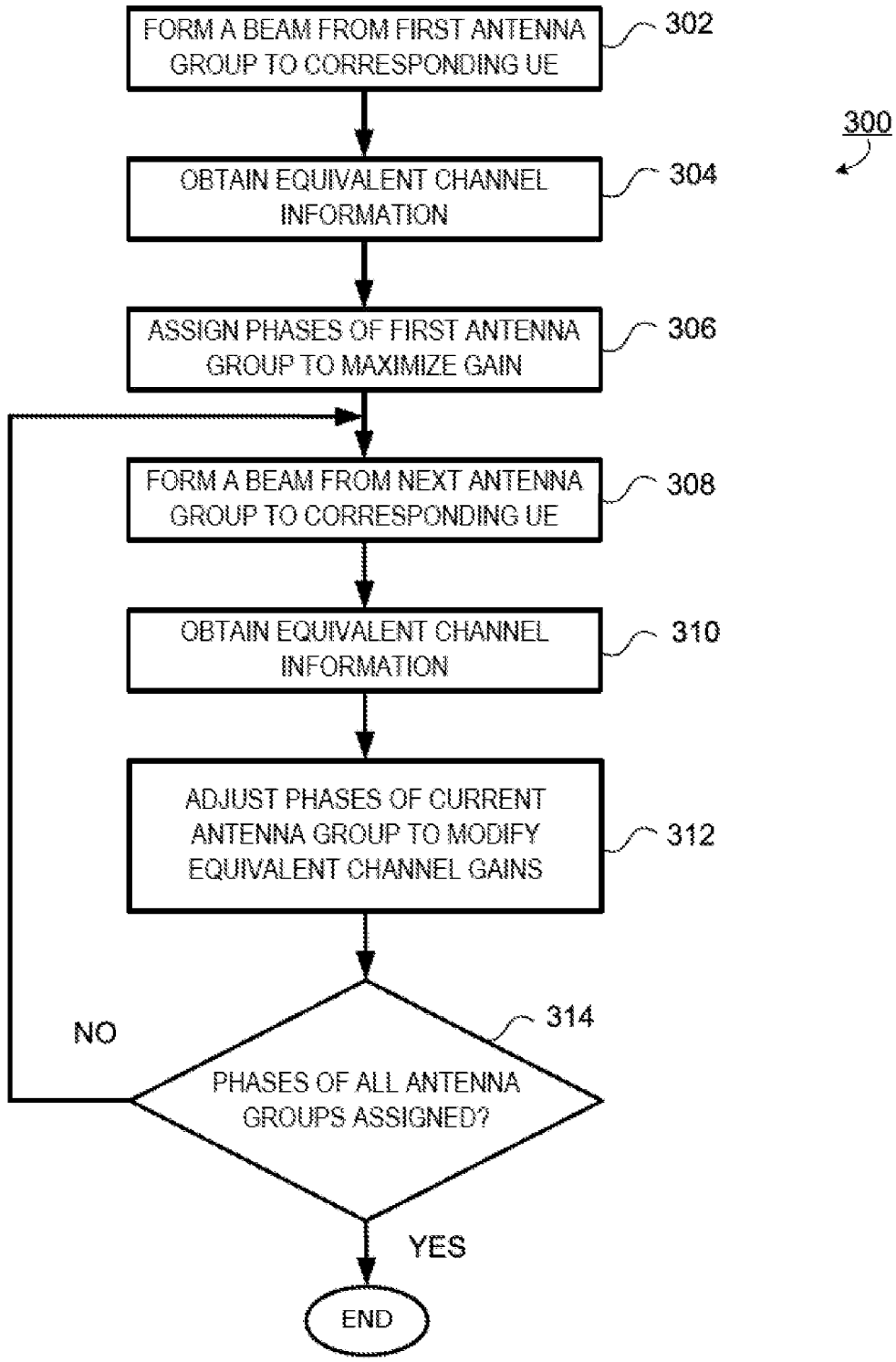
FIG. 3 is a flow chart diagram illustrating a method of adjusting an equivalent channel for a downlink in accordance with another embodiment of the present disclosure.
Figure 4:
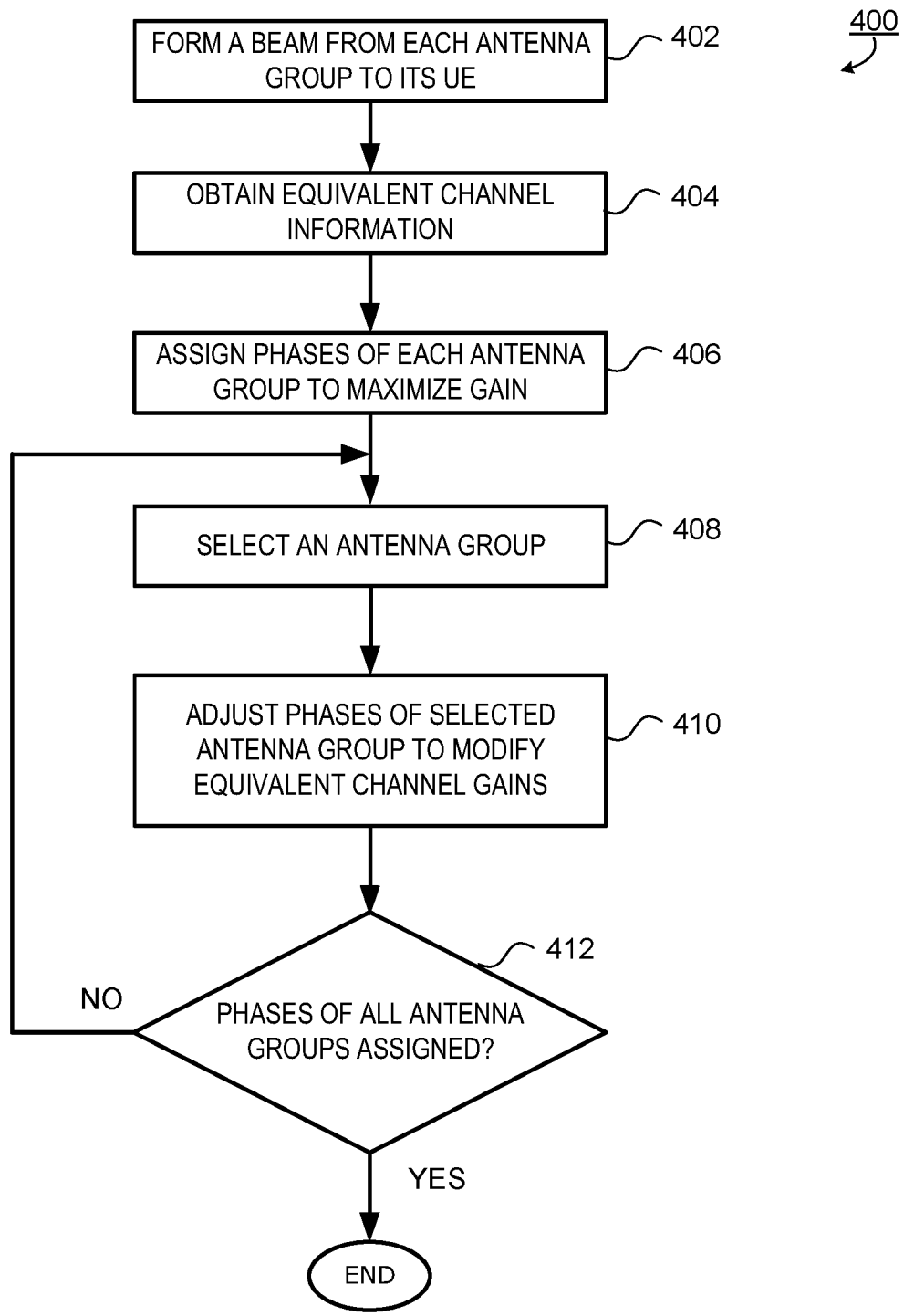
FIG. 4 is a flow chart diagram illustrating a method of adjusting an equivalent channel for a downlink in accordance with another embodiment of the present disclosure.
Figure 5:
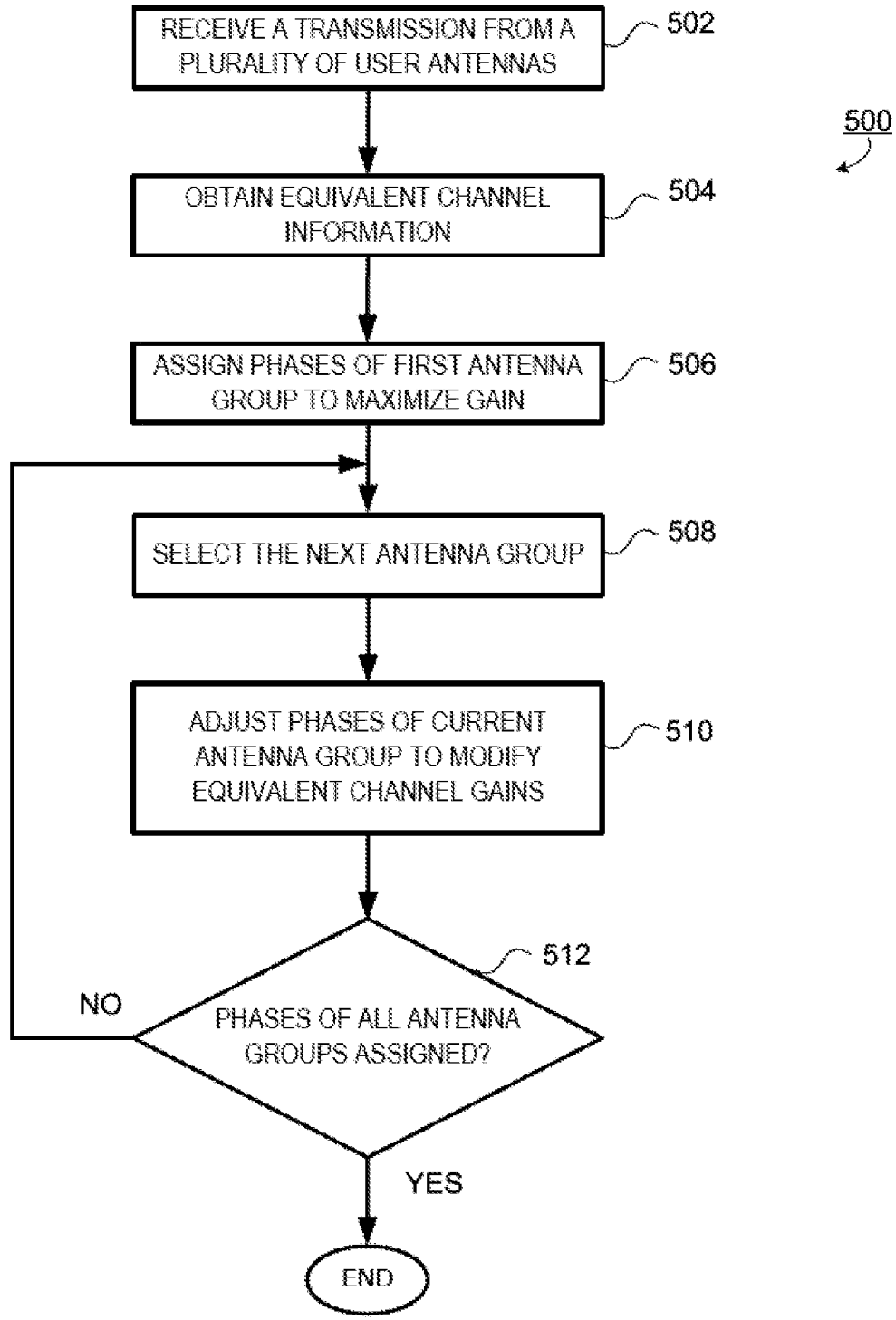
FIG. 5 is a flow chart diagram illustrating a method of adjusting an equivalent channel for an uplink in accordance with an embodiment of the present disclosure.

Method 200 of FIG. 2 is an example method that may be used in a variety of embodiments disclosed herein. There are a number of variations that may be performed with respect to method 200. FIGS. 3, 4, and 5 illustrate different variations of method 200, according to various embodiments.

Methods 300 and 400 correspond to method 200 when it is used for a downlink. Method 500 corresponds to method 200 when it is utilized for an uplink.

Methods 300 and 400 correspond to processes 202, 204, and 206 of FIG. 2. Method 500 corresponds to processes 204 and 206 of FIG. 2.

Although not illustrated in FIGS. 3 and 4, methods 300 and 400 may both include processes 208, 210, and 212. In other words, methods 300 and 400 can be used as part of a method of performing a downlink. Similar to method 200, methods 300, 400, and 500 can also include an initiation phase.

A flowchart illustrating a method 300 of adjusting an equivalent channel for a downlink in system 100 is illustrated in FIG. 3. The method may be carried out by software executed, for example, by processor 106 of base station 102. Coding of software for carrying out such a method is within the scope of a person of ordinary skill in the art given the present description. The method may contain additional or fewer processes than shown and/or described, and may be performed in a different order. Computer-readable code executable by at least one processor of base station 102 to perform the method may be stored in a computer-readable storage medium device or apparatus, which may be a non-transitory or tangible storage medium.

At 302, a beam is formed from one of the antenna groups to its corresponding user device or UE.

At 304, equivalent channel information is obtained by the base station. The equivalent channel information may be obtained in various ways. For example, in some embodiments, feedback is received from the user device corresponding to the first antenna group. In an embodiment, the feedback comprises the gain that the user device measures from the first RF chain. The first RF chain is the RF chain coupled to the first antenna group.

At 306, the phases of the antennas of the first antenna group are assigned to maximize the gain from the first RF chain to its corresponding user device.

At 308, a beam is formed from the next antenna group to its corresponding user device.

At 310, equivalent channel information is obtained by the base station. The equivalent channel information may be obtained in various ways. For example, in an embodiment, feedback is received from the user device corresponding to the antenna group that formed a beam at 308. In an embodiment, the feedback comprises the gain that the user device detects from various RF chains. In an embodiment, compressed sensing is used and the feedback includes only the gains detected from a subset of the various RF chains. In various embodiments, the subset corresponds to not more than a third of the RF chains. In other embodiments, the subset corresponds to not more than a fifth of the RF chains. In other embodiments, the subset corresponds to not more than three RF chains. In various embodiments, the subset corresponds to not more than three, two, or one RF chain(s). In some embodiments, the feedback comprises only the gains of RF chains where the detected gain is above a threshold value.

At 312, the phases of the antennas of the current antenna group, which is the antenna group selected at 308, are assigned in order to modify equivalent channel gains, based on the equivalent channel information. In an embodiment, when the phases the antennas of a particular antenna group are adjusted, the phases of the other antennas are treated as being fixed.

Modifying the equivalent channel gains has the effect of altering or adjusting a characteristic of the equivalent channel matrix. In some embodiments, the characteristic that is adjusted is the determinant of the equivalent channel matrix and the phases are adjusted to maximize the determinant. This can be accomplished in the manner described above. In other embodiments, other characteristics are adjusted. For example, in an embodiment, the Frobenius norm of the equivalent channel matrix is maximized. In another embodiment, the corresponding capacity of the equivalent channel, which is determined by the equivalent channel matrix, is maximized. In yet other embodiments, a combination of the determinant and Frobenius norm are maximized. In yet other embodiments, a function of the equivalent channel matrix is optimized. In an embodiment, when the phases of a particular antenna group are adjusted to alter a characteristic of the equivalent channel matrix at 312, the phases of the antennas of other antenna groups are treated as being fixed.

At 314, it is determined if the antennas of all of the antenna groups have had their phases adjusted. If not, then 308 is repeated with the next antenna group. If yes, then the process ends.

The process may be repeated from time to time to update the phases based on changing conditions. As will be understood by those of skill in the art, the frequency required for updates will be dependent on various system parameters.

In practice, if there are a small number of scatterers and the numbers of antennas in each group is large; there will be only a few cross interferences between antenna groups and users. In such environments where channels from transmit RF chains to users become sparse, one can implement this method by two-step analog beamforming. Accordingly, in some embodiments the following approach is used:

First, the analog phases of the antennas of each RF chain are assigned to maximize the gain of the direct link from that RF chain to its intended recipient (e.g. the user device). In an embodiment, this can be done in parallel, that is, the analog phases of the antennas of all the RF chains can be assigned at the same time.

Second, based on equivalent channel information, modify the analog phases to increase the determinant of the equivalent channel matrix. In some embodiments, the equivalent channel information is obtained from feedback received from the user devices. The equivalent channel information can include information regarding the dominant cross interferences in the system.

A flowchart illustrating a method 400 of adjusting an equivalent channel for a downlink in system 100 is illustrated in FIG. 4. The method may be carried out by software executed, for example, by processor 106 of base station 102. Coding of software for carrying out such a method is within the scope of a person of ordinary skill in the art given the present description. The method may contain additional or fewer processes than shown and/or described, and may be performed in a different order. Computer-readable code executable by at least one processor of base station 102 to perform the method may be stored in a computer-readable storage medium device or apparatus, which may be a non-transitory or tangible storage medium.

At 402, a beam is formed from each of the antenna groups to their respective corresponding user devices or UEs. In an embodiment, the antenna groups can form their beams in parallel. In other words, in an embodiment, the antenna groups can form their beams at the same time.

At 404, equivalent channel information is obtained by the base station. The equivalent channel information may be obtained in various ways. For example, in some embodiments, feedback is received from each of the user devices. In an embodiment, the feedback comprises the gain that the user device detects from various RF chains. In an embodiment, compressed sensing is used and the feedback includes only the gains detected from a subset of the various RF chains. In various embodiments, the subset corresponds to not more than a third of the RF chains. In other embodiments, the subset corresponds to not more than a fifth of the RF chains. In various embodiments, the subset corresponds to not more than three, two, or one RF chain(s). In some embodiments, the feedback comprises only the gains of RF chains where the detected gain is above a threshold value.

At 406, the phases of the antennas of each of the antenna groups are assigned to maximize the gain from each RF chain to its intended UE.

At 408, one of the plurality of antenna groups is selected.

At 410, the phases of the antennas of the selected antenna group are adjusted in order to modify equivalent channel gains, based on the equivalent channel information. Modifying the equivalent channel gains has the effect of altering or adjusting a characteristic of the equivalent channel matrix. In some embodiments, the characteristic is the determinant of the equivalent channel matrix and the phases are adjusted to maximize the determinant. This can be accomplished in the manner described above. In other embodiments, other characteristics are adjusted. For example, in an embodiment, the Frobenius norm of the equivalent channel matrix is maximized. In another embodiment, the corresponding capacity of the equivalent channel, which is determined by the equivalent channel matrix, is maximized. In yet other embodiments, a combination of the determinant and Frobenius norm are maximized. In yet other embodiments, any suitable function of the equivalent channel matrix is optimized. In an embodiment, when the phases the antennas of a particular antenna group are adjusted to alter a characteristic of the equivalent channel matrix at 410, the phases of the antennas of other antenna groups are treated as being fixed.

At 412, it is determined if the antennas of all of the antenna groups have had their phases adjusted. If not, then 406 is repeated with the next antenna group. If yes, then the process ends.

As mentioned above, method 400 need not be performed in the particular manner or order shown above. For example, 408 to 412 are shown in a manner consistent with a recursive operation. Indeed, in an embodiment, method 400 can be executed by successively adjusting the phases of the various antenna groups. However, in another embodiment, 408 to 412 can be performed in parallel for all of the antenna groups.

The process may be repeated from time to time to update the phases based on changing conditions. As will be understood by those of skill in the art, the frequency required for updates will be dependent on various system parameters.

Some embodiments of base station 102, which utilize the above-described method, use the method in conjunction with a variety of precoding techniques, such as for example, but not limited to, DPC type precoding techniques and linear precoding techniques, such as zero forcing techniques.

In the above-described scenario where the channel is sparse, feedback of dominant cross interferences can be reduced by using methods based on compressed sensing.

Some embodiments utilizing the above-described methods have only a small feedback overhead. In particular, in some such embodiments, based on the sparsity assumption, the feedback overhead is proportional to the number of RF chains. As a result of the feedback overhead, some such embodiments are able to make use of either FDD or TDD. Accordingly, unlike traditional massive MIMO systems, the options for transmission between the base station and UEs are not limited to TDD.

Figure 6:
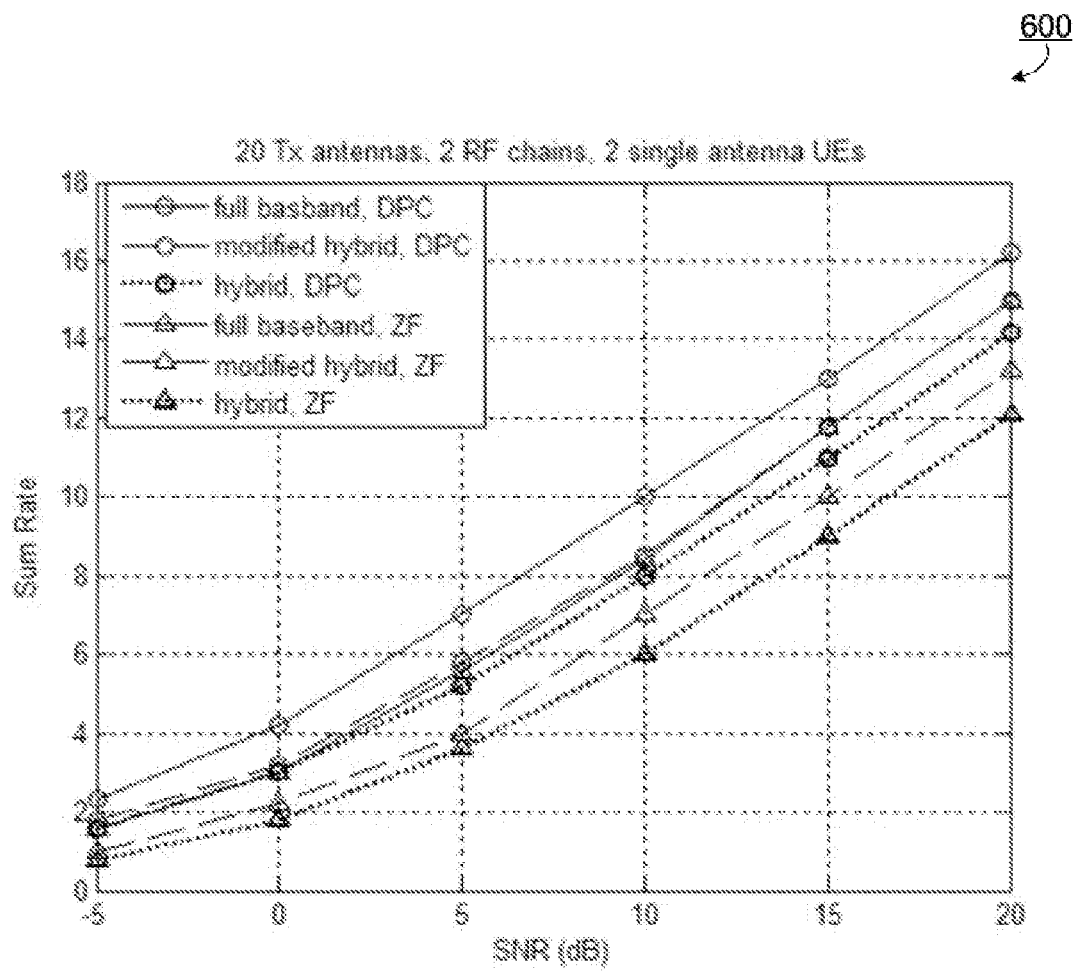
FIGS. 6 and 7 illustrate graphs showing the simulated performance of various embodiments.
Figure 7:
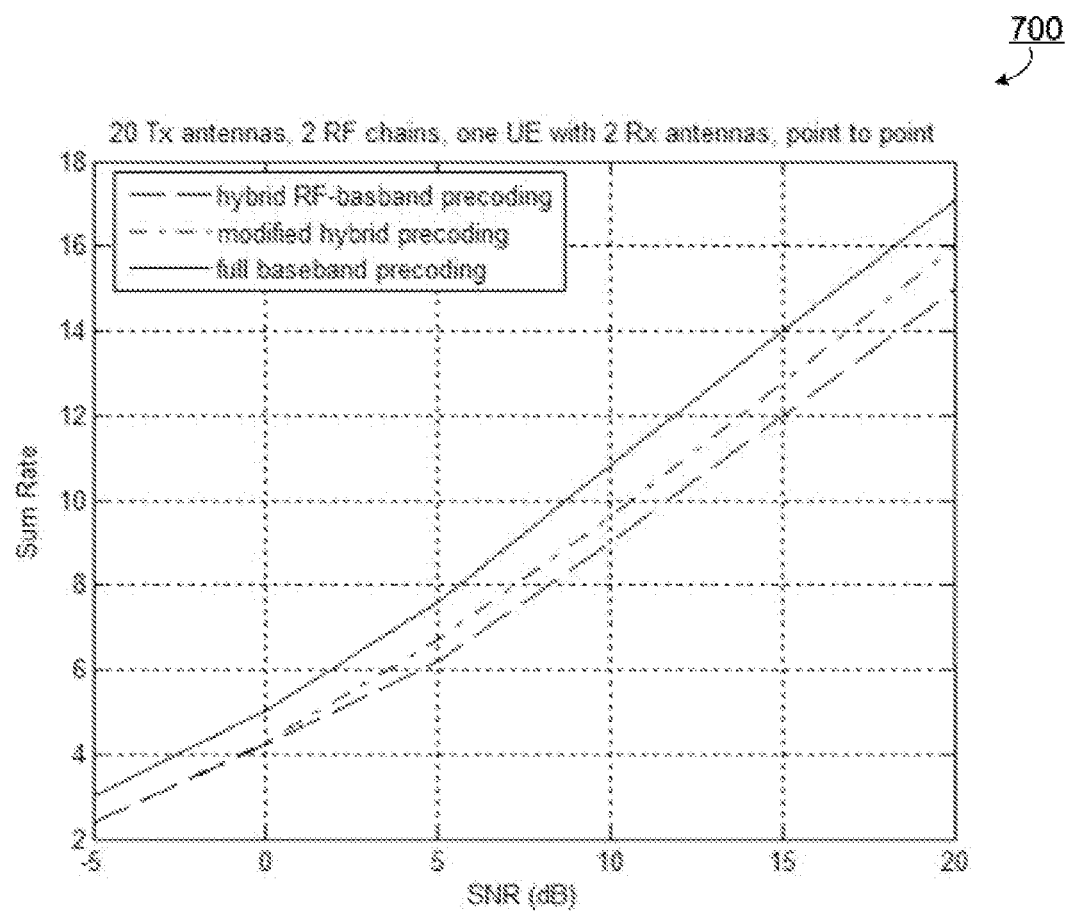

In addition, variations of the above described methods are applicable in multi-cell CoMP scenarios. When different groups of antennas (and their corresponding RF chains) are assumed to be located in different places (different base station), the situation becomes similar to the CoMP scenario. Various embodiments described herein are applicable to joint transmission in CoMP type scenarios. Based on the present disclosure, a person of skill in the art will understand how to apply the above described method to a CoMP type scenario The same modified hybrid baseband-RF precoding/decoding can be applied to point-to-point MIMO with a reduced number of RF chains such as system 150 illustrated in FIG. 2. The simulation results discussed below in relation to FIGS. 6 and 7 show gains, without any increase in hardware complexity compared to the direct hybrid baseband-RF system. The UE can have multiple antennas, with the number of antennas being the same as the number of RF chains or fewer.

This point-to-point model can also be applied to a multiuser system when different sets of RF chains are grouped to form non-overlapping beams to UEs. For example, this can be used in a system having 10 RF chains, where each RF chain is connected to 10 antennas, are grouped into 2 subsets, serving two UEs using non-overlapping beams.

The above described methods focused on precoding/decoding. Some embodiments of system 100 and 150 utilize a similar approach for RF detection in an uplink. In the case of an uplink, one challenge is to design a linear combining matrix G to improve the capacity of the equivalent channel which is defined as $H_{eq}=GH$ where H is the NL×M channel matrix. The assumption is that nonzero entries of G are only complex phases and on each column, there is only one nonzero entry (i.e. each antenna is only connected to one receiving RF chain).

Various embodiments of system 100 improve the capacity of the equivalent channel matrix $H_{eq}$ by obtaining the phases for the $(i+1)^{th}$ RF chain 108 of base station 102 in the following manner. In order to simplify the explanation, consider the situation in which one RF chain 108 is assigned to each single-antenna user device 112. Consider $H_{i+1}$ as the first i+1 columns of the matrix H (corresponding to the first i UEs) and $G_i$ as the first i rows of the matrix G (that are completed in previous steps) and $G_{i,k}$ as an (i+1)×NL matrix which is obtained by adding a row to the matrix whose entries are zero other than the $(Li+k)^{th}$, which is 1 (corresponding to analog phase on $k^{th}$ antenna connecting to the $(i+1)^{th}$ RF chain). Then base station 102 obtains the phase corresponding to the analog phase on $k^{th}$ antenna connecting to the $(i+1)^{th}$ RF chain (assuming that the phases of the first i antenna array are fixed) by performing the following operation:

$$g_{iL+k} = \frac{(\det(G_{i,k}H_{i+1}))'}{|\det(G_{i,k}H_{i+1})|}$$

where (x)' designates the complex conjugate of x. For the case that N>M and multiple RF chains correspond to the same single-antenna UE, the same algorithm can be applied by considering jL antennas corresponding to the first i UEs (j≥i) and obtaining $g_{jL+k}$ for all antennas corresponding to the $(i+1)^{th}$ UE (for $1 \le k \le n_{i+1}L$ where $n_{i+1}$ is the number of RF chains assigned to the $(i+1)^{th}$ UE).

A flowchart illustrating a method 500 of adjusting an equivalent channel for an uplink in system 100 is illustrated in FIG. 5. The method may be carried out by software executed, for example, by processor 106 of base station 102. Coding of software for carrying out such a method is within the scope of a person of ordinary skill in the art given the present description. The method may contain additional or fewer processes than shown and/or described, and may be performed in a different order. Computer-readable code executable by at least one processor of base station 102 to perform the method may be stored in a computer-readable storage medium device or apparatus, which may be a non-transitory or tangible storage medium.

At 502, transmissions are received from the various UEs at each of the antenna groups. In an embodiment, the transmissions from the UEs can be normal uplink transmissions having communication data (i.e. the data in the message does not include equivalent channel information) or pilot signals.

At 504, the base station obtains equivalent channel information. In an embodiment, the base station estimates the equivalent channel information based on the transmissions that were received at 502.

At 506, the phases of the antennas of the first antenna group are assigned to maximize the gain from the first UE to the first RF chain.

At 508, the next antenna group is selected.

At 510, the phases of the antennas of the current antenna group, which is the antenna group most recently selected at 508, are adjusted in order to modify equivalent channel gains, based on the equivalent channel information. Modifying the equivalent channel gains has the effect of altering or adjusting a characteristic of the equivalent channel matrix. In some embodiments, the characteristic that is adjusted is the determinant of the equivalent channel matrix and the phases are adjusted to maximize the determinant. This can be accomplished in the manner described above. In other embodiments, other characteristics are adjusted. For example, in an embodiment, the Frobenius norm of the equivalent channel matrix is maximized. In yet other embodiments, a combination of the determinant and Frobenius norm are maximized. In yet other embodiments, a function of the equivalent channel matrix is optimized. Accordingly, in various embodiments, the phases of the antenna groups are adjusted in a recursive manner, that is, one antenna group at a time. In an embodiment, when the phases the antennas of a particular antenna group are adjusted, the phases of the antennas of other antenna groups are treated as being fixed.

At 512, it is determined if the antennas of all of the antenna groups have had their phases adjusted. If not, then 508 is repeated with the next antenna group. If yes, then the process ends.

The process may be repeated from time to time to update the phases based on changing conditions. As will be understood by those of skill in the art, the frequency required for updates will be dependent on various system parameters.

In order to evaluate the performance of the system simulations have been performed. In the simulations described below, a linear arrangement of the antennas with half bandwidth spacing is assumed. Users are assumed to be located randomly with angles of departure between −60 to 60 degrees. The channel model is obtained by applying different phase vectors to channel gains for different UEs (based on the angle of departure).

FIG. 6 illustrates a graph 600 showing the simulated downlink performance of various embodiments of system 100 as compared to other systems. Graph 600 plots the signal to noise ratio (SNR) against the sum rate of the overall system. FIG. 6 corresponds to an embodiment of system 100 in which there are 2 single-antenna user devices 112, 2 RF chains 108, and each RF chain 108 is coupled to an antenna group 110 with 10 antennas (for a total of 20 transmitter antennas in the system). The full baseband precoding plots of graph 600 correspond to a system in which there is one RF chain per antenna group. The hybrid system plots correspond to a system that has multiple antennas (e.g. an antenna group) coupled to each RF chain. The modified hybrid plots correspond to systems in accordance with the present disclosure, which have RF chains that are coupled to antenna groups and which use the precoding methods described herein. Graph 600 illustrates plots for when the various systems use the Dirty Paper Coding (DPC) technique and also for when the systems use the Zero Forcing (ZF) technique.

FIG. 7 illustrates a graph 700 showing the simulated downlink performance of an embodiment of system 150 in which there is one user device 112 having 2 antennas, and 2 RF chains 108 each is coupled to an antenna group 110 with 10 antennas (for a total of 20 transmitter antennas in the system). Graph 700 plots the signal to noise ratio (SNR) against the sum rate of the various systems.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of adjusting an equivalent channel for a downlink or an uplink in a multiple-antenna communication system, the system comprising a plurality of user devices and a base station having a plurality of analog RF chains, each analog RF chain being coupled to a plurality of antennas and each user device corresponding to a RF chain, the method comprising, for each of the user devices:
    obtaining, by the base station, equivalent channel information including:
        transmitting, by the base station, a RF beam to the user device; and
        receiving, by the base station, feedback from the user device, the feedback including the equivalent channel information; and
    adjusting, by the base station, phases of the antennas in each of the plurality of antennas coupled to the RF chain corresponding to the user device in order to modify equivalent channel gains between the RF chain and the user device, based on the equivalent channel information.

2. The method of claim 1, wherein the feedback is generated based on compressed sensing techniques.

3. The method of claim 1, wherein the phases are adjusted in a recursive manner for the plurality of user devices.

4. The method of claim 1, wherein when adjusting the phases of antennas of a RF chain, the phases of antennas of previously processed RF chains are treated as fixed.

5. The method of claim 1, wherein modifying equivalent channel gains between the RF chain and the user device comprises maximizing a determinant of an equivalent channel matrix for the system.

6. The method of claim 1, wherein modifying equivalent channel gains between the RF chain and the user device comprises maximizing a Frobenius norm of an equivalent channel matrix for the system.

7. The method of claim 1, before adjusting the phases of the antenna groups, the method further comprising:

assigning phases of the antennas of each RF chain to maximize a direct gain from each RF chain to the corresponding user device based on the received feedback.

8. The method of claim 1, wherein adjusting phases of the antennas comprises:

assigning, by the base station, phases of antennas of a first RF chain to maximize the gain from a first user device to the first RF chain of the base station; and assigning, by the base station, phases of antennas of other RF chains of the base station, in order to modify equivalent channel gains between the plurality of user devices and the RF chains.

9. A base station comprising:

a plurality of analog RF chains, each RF chain corresponding to a respective one of a plurality of user devices;

a plurality of antenna groups, each antenna group coupled to one of the plurality of RF chains, each antenna group comprising a plurality of antennas; and a processor coupled to the plurality of RF chains, the processor configured to, for each of the user devices:

obtain equivalent channel information including:

transmitting a RF beam to the user device; and receiving feedback from the user device, the feedback including the equivalent channel information; and based on the equivalent channel information, adjust phases of the plurality of antennas in the antenna group coupled to the RF chain corresponding to the user device in order to modify equivalent channel gains between the RF chain and the user device.

10. The base station of claim 9, wherein when adjusting phases of antennas, the phases of antennas of previously processed RF chains are treated as fixed.

11. The base station of claim 9, wherein adjusting phases of the antennas comprises:

assigning, by the base station, phases of antennas of a first RF chain to maximize the gain from a first user device to the first RF chain of the base station; and assigning, by the base station, phases of antennas of other RF chains of the base station, in order to modify equivalent channel gains from the plurality of user devices to the analog RF chains.

12. The base station of claim 9, wherein modifying equivalent channel gains between the RF chain and the user device comprises maximizing a determinant of an equivalent channel matrix for the system.

13. The base station of claim 9, wherein modifying equivalent channel gains between the RF chain and the user device comprises maximizing a Frobenius norm of an equivalent channel matrix for the system.

* * * * *